May 19, 1953 W. P. WILLS 2,639,305
ANNULAR THERMOCOUPLE
Filed March 28, 1950
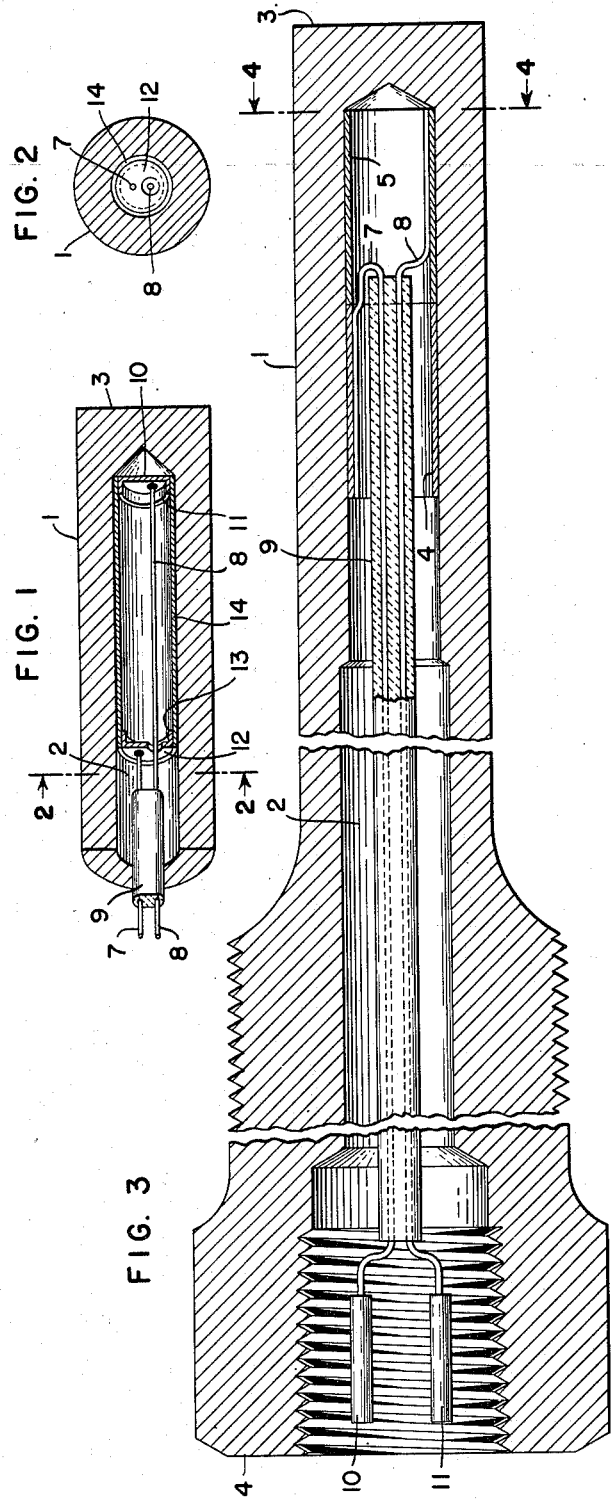
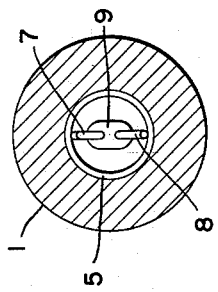
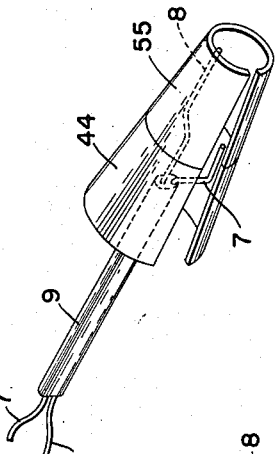
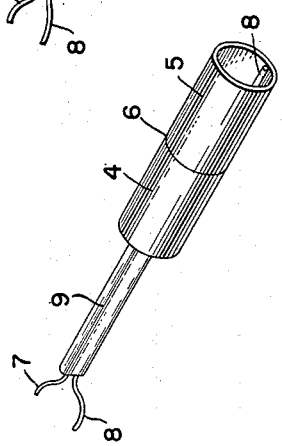
*INVENTOR.*
WALTER P. WILLS
BY
*Arthur H. Swanson*
ATTORNEY.

Patented May 19, 1953

2,639,305

UNITED STATES PATENT OFFICE 2,639,305

ANNULAR THERMOCOUPLE

Walter P. Wills, Philadelphia, Pa., assignor to Minneapolis-Honeywell Regulator Company, Minneapolis, Minn., a corporation of Delaware Application March 28, 1950, Serial No. 152,422

12 Claims. (Cl. 136—4)

This invention relates to a thermoelectric pyrometer which consists essentially of three parts. Part one is a thermocouple of two or more different metals or alloys having one or more fused junctions (the hot junctions), which are inserted into the furnace or other space whose temperature is to be measured, and a cold junction, which is located outside of the furnace or other space and is maintained at some fixed temperature, such as that of the room or that of melting ice. Part two is the two extension wires, usually of copper, running from the cold junction of the thermocouple to an indicator. Part three is the indicator, which may be a millivoltmeter, a potentiometer, or a special type of instrument embodying both of these principles. The indicator may be graduated to read E. M. F., or temperature, or both. The hot junction of the thermocouple is usually enclosed in a sheath or protecting casing which projects into the furnace chamber or other space whose temperature is to be measured and which has a closed inner end and an open outer end through which the extension wires may pass.

It is an object of this invention to provide a thermoelectric pyrometer with novel means effective to improve the heat transfer relation between the hot junction of the thermocouple and the wall of the casing or tube in which the thermocouple is located. Because of this improved heat transfer, the thermocouple responds more quickly and directly to variations in the temperature to which the casing or tube is exposed while the casing or tube protects the delicate thermocouple from the injurious chemical or mechanical effects of the gas, liquid, or molten or otherwise fluent solid, whose temperature is being measured.

More specifically, this improved heat transfer relation between the tube and the thermocouple is achieved by making the thermocouple in the form of two disks abutting at their rims on a cylindrical tube or in the form of tubes of O-shape or C-shape in transverse cross section. These two disks or tubes are of different metals or alloys, or, at least, have their adjacent or abutting surfaces of different metals or alloys to form the hot junction. The disks or tubes have sufficient resiliency to expand into contact with the inner wall of the well and thus provide good metal to metal contact which insures maximum heat transfer and quickest response speed.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a partial, longitudinal cross section.

Fig. 2 is a transverse cross section on line 2—2 of Fig. 1.

Fig. 3 is a longitudinal cross section of a modification.

Fig. 4 is a transverse cross section on line 4—4 of Fig. 3.

Fig. 5 is a perspective view of the thermocouple of this modification.

Fig. 6 is a perspective view of a second modification.

In Figs. 1 and 2 the protecting tube 1 has a hollow internal cavity 2, a closed inner end 3, and an open outer end 4 (similar to that shown in Fig. 3).

Tube 1 may be of iron, steel, Chromel, porcelain, fire clay or the like.

Within cavity 2 is located the thermocouple which has two hot junctions. These hot junctions are made up as follows. A disc 10 is cupped or flanged at its edge 11 and disc 12 is likewise cupped or flanged at 13. The two flanges 11 and 13 abut against the inner end walls of a cylinder 14. An extension wire 8 is soldered or otherwise connected in good electrical contact with disc 10 and passes through a hole in disc 12 or is otherwise insulated from disc 12. A second extension wire 7 is soldered or otherwise fastened in good electrical contact with disc 12. Extension wires 7 and 8 are led off to the cold junction through one or more perforated insulators 9 which may be of porcelain. The different metals or alloys which may be used for thermocouples are well known. For example, disc 10 may be of iron, cylinder 14 of copper, and disc 12 of constantan.

If it is desired to incorporate a rate effect in the temperature measurement, one of the discs can be of different mass from the other. This can be done by increasing the thickness of one disc.

Cylinder 14 is preferably placed in close fitting engagement with protecting tube 1 so as to provide for good heat transfer therebetween. However, the thermocouple hot junction may be spaced or otherwise placed in less favorable heat transfer relation to protecting tube 1 if this is desirable, for any reason.

Figs. 3, 4, and 5 show a modification of this invention. In this modification, the hot junction consists of a tube 4 of one metal and a tube 5 of another metal. Copper-constantan or iron-constantan are two well known couples. Tubes 4 and 5 are fused, welded or otherwise intimately united at their abutting, annular surface 6 to form the interface of the hot junction. Connected to tube 4 is a wire 7 of the same metal or alloy. Connected to tube 5 is a wire 8 of the same metal or alloy. Wires 7 and 8 form the connections to the cold junction of the thermocouple. Wires 7 and 8 pass through perforated insulators 9 of porcelain or the like. At their left ends the wires 7 and 8 terminate in connectors 10 and 11 by means of which these wires may be connected to lead wires for connection to the indicator.

Tubes 4 and 5 are sufficiently strong to be self-supporting and have sufficient resiliency to engage the inner surface of tube 1 so as to provide for the ready conduction of heat between tube 1 and the thermocouple tubes 4 and 5.

However, it is not necessary for the thermocouple tubes 4 and 5 to engage the inner wall of tube 1. The thermocouple tubes may be spaced from the inner wall of tube 1. The space between the thermocouple and the inner wall of tube 1 may be filled with heat-conducting or non-heat-conducting material so as to center or properly locate the thermocouple within its surrounding tubes. Likewise, although the tubes 4 and 5 have been shown as abutting at their ends in a ring-shaped hot junction interface 6, either tube might be enclosed or partially enclosed within the other so that the annular surface or hot junction interface between them is formed of the whole or a part of the inner, opposite surface of one tube and the outer, opposite surface of the other tube.

Fig. 6 shows a modification in which the tubes 44 and 55 are of C-shape in transverse cross section and are of the general shape of split frustums of cones. Such a thermocouple may be pushed into a well having a smaller internal diameter than the external diameter of the thermocouple. The thermocouple is thus conformed to the internal diameter of the well, and provides the preferred heat-conducting metal-to-metal contact therebetween. Wire 7 connects to tube 44 and wire 8 to tube 55. Wires 7 and 8 lead off through insulators 9 as in the second modification.

The term "metal," as used in this specification and claims, comprehends alloys, mixtures and other metallic substances which give a thermoelectric effect when engaged with another. The term "metal" is not limited to those substances commonly known in chemistry as metal elements.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a thermocouple, a substantially annular tube of sufficient strength to stand alone and of sufficient elasticity to yieldingly engage the walls of a protecting well and having interengaging surfaces of two different metals, said interengaging surfaces constituting the hot junction of the thermocouple.

2. A temperature indicating device, including, a protecting casing, and a thermocouple having a hot junction formed of two substantially annular tubes adjacent said protecting tube and in yielding heat-transfer relation therewith to receive heat therefrom and having engaging surfaces of different metals forming a hot junction.

3. A temperature indicating device, including, a protecting casing, and a thermocouple comprising split truncated conical members of substantially C-shape in transverse cross section and having adjacent surfaces of different metals forming a hot junction.

4. A thermocouple including two tubes each of a dissimilar metal of sufficient strength to maintain their shape and of sufficient flexibility to engage a protecting tube and welded together at abutting surfaces to form a hot junction.

5. A thermometric device, including, a thermocouple-surrounding casing formed with a thermocouple-receiving chamber, and a thermocouple within said chamber and having an external cross section approximating the internal cross section of said chamber and composed of at least segments of substantially concentric hollow cylinders, the outer portion of said thermocouple bearing against the inner wall of said casing in yielding heat-transfer relation and the portions of said thermocouple adjacent each other being composed of different metals united to form a hot junction.

6. A thermometric device, including, a thermocouple-surrounding casing formed with a thermocouple-receiving chamber, and a thermocouple located within said chamber and formed of adjacent segments of approximately concentric hollow cylinders, the outer surface of said thermocouple bearing snugly in yielding heat-transfer relation against the inner wall of the casing and the adjacent surfaces of said cylinders being formed of different metals united to formed a hot junction.

7. A thermometric device, including, a thermocouple-surrounding casing formed with a thermocouple-receiving chamber, and a thermocouple located within said chamber and formed of a cylinder of one metal, a disc of a second metal integrally united to a portion of said cylinder to form a hot junction, and a second disc of a third metal integrally united to said cylinder at another portion spaced from said first portion to form a second hot junction.

8. A temperature indicating device comprising a thermocouple having a hot junction formed by the engagement of at least two, coaxial, self-supporting members composed of at least segments of substantially concentric hollow curved elements having sufficient elasticity to yieldingly engage the walls of a protecting well so as to be in good heat transfer relation therewith.

9. A thermocouple having a hot junction consisting of at least a major segment of a tube of one metal, and at least a major segment of a second tube having substantially identical external diameter and of another metal, said tubes being intimately united at an abutting, annular surface to form the interface of the hot junction.

10. A thermometric device, including, a thermocouple-surrounding casing formed with a thermocouple-receiving chamber, and a thermocouple located within said chamber and formed of two sheets each extending for a substantially complete circle in transverse cross section, the outer surface of each of said sheets being equal in size to that of the other and bearing snugly against the inner wall of said casing, and the adjacent surfaces of said sheets being formed of different metals united to form a hot junction.

11. A thermocouple having a hot junction, comprising, a tube of one metal, a tube of substantially identical size and of another metal, said tubes being fastened together end-to-end by a ring-shaped interface so as to form one tube whose length is equal to that of its component parts, and a lead wire of the same metal as one of said tubes connected to the inner surface thereof, and a lead wire of the same metal as the other of said tubes connected to the inner surface of the other of said tubes.

12. A temperature indicating device, including, a protective casing, and a thermocouple substantially surrounded by said protecting casing and formed of a sheet of at least C-shape in transverse cross section extending at least half the circumference of a circle and having adjacent surfaces of different metals forming a hot junction and having a uniform external diameter in contact with the internal diameter of said casing.

WALTER P. WILLS.

References Cited in the file of this patent

UNITED STATES PATENTS

| Number | Name | Date |
|---|---|---|
| 383,464 | Gulcher | May 29, 1888 |
| 398,272 | Mestern | Feb. 19, 1889 |
| 2,012,112 | States | Aug. 20, 1935 |
| 2,186,707 | Ray | Jan. 9, 1940 |
| 2,355,227 | Mantz | Aug. 8, 1944 |
| 2,378,804 | Sparrow | June 19, 1945 |

FOREIGN PATENTS

| Number | Country | Date |
|---|---|---|
| 217,049 | Great Britain | June 12, 1924 |